(12) United States Patent
Carpenter (10) Patent No.: US 11,821,577 B2
(45) Date of Patent: Nov. 21, 2023

(54) REMOVABLE HANGING DEVICE COMPRISING AN EXTENDING FLANGE

(71) Applicant: Jim Carpenter, Wilmington, NC (US)

(72) Inventor: Jim Carpenter, Wilmington, NC (US)

( * ) Notice: Subject to any disclaimer, the term of this patent is extended or adjusted under 35 U.S.C. 154(b) by 0 days.

(21) Appl. No.: 17/458,700

(22) Filed: Aug. 27, 2021

(65) Prior Publication Data

US 2023/0062078 A1    Mar. 2, 2023

(51) Int. Cl.
*E04F 13/08* (2006.01)
*F16M 13/02* (2006.01)

(52) U.S. Cl.
CPC ....... *F16M 13/022* (2013.01); *E04F 13/0864* (2013.01)

(58) Field of Classification Search
CPC ....... F21S 4/10; F21V 21/088; E04F 13/0864; E04F 21/1855; F16B 45/00
See application file for complete search history.

(56) References Cited

U.S. PATENT DOCUMENTS

| | | | |
|---|---|---|---|
| 4,698,942 A * | 10/1987 | Swartz | E04F 13/0864 52/99 |
| 4,771,974 A * | 9/1988 | Carlson | A47G 1/20 248/231.81 |
| D349,447 S * | 8/1994 | Daniller | D8/367 |
| 6,932,310 B1 * | 8/2005 | Diss | A47G 7/044 248/301 |
| 7,434,329 B2 * | 10/2008 | Walda | E04F 21/1855 33/649 |
| D584,939 S * | 1/2009 | Snell | D8/367 |
| D597,400 S * | 8/2009 | Matejcik | D8/367 |
| 7,721,488 B1 * | 5/2010 | Bennett | E04F 13/0864 52/302.6 |
| 7,823,853 B2 * | 11/2010 | Larson | F21V 21/088 248/339 |
| 8,713,889 B2 * | 5/2014 | Buttner | E04H 4/10 52/698 |
| 10,301,816 B2 * | 5/2019 | DeBuff | E04F 13/0887 |
| 10,900,221 B2 * | 1/2021 | McEndree | E04F 21/1855 |
| 2003/0042474 A1 * | 3/2003 | Boydon | A45F 5/00 254/25 |
| 2003/0066938 A1 * | 4/2003 | Zimmerman | F21V 21/088 248/301 |
| 2019/0309898 A1 * | 10/2019 | Krake | F16B 5/126 |

* cited by examiner

*Primary Examiner* — Brian E Glessner
*Assistant Examiner* — Daniel J Kenny
(74) *Attorney, Agent, or Firm* — Johnny Lam (57) ABSTRACT

The invention is directed to a hanging device that can be removably installed between the boards of a support surface, such as siding boards. The hanger comprises a main body with first and second ends and a length therebetween. A flange is positioned at the first end of the main body, and functions to retain the hanger in between adjacent slats of a support surface. The second end of the main body includes a retention element that can be used to support the weight of an object, such as a hanging plant, artwork, shelving unit, and the like.

20 Claims, 11 Drawing Sheets

REMOVABLE HANGING DEVICE COMPRISING AN EXTENDING FLANGE

TECHNICAL FIELD

The presently disclosed subject matter is generally directed to a removable hanging device comprising an extending flange that cooperates with one or more support surfaces, such as siding or cement planks.

BACKGROUND

It is often desirable to hang one or more decorative items on the interior or exterior of a home (e.g., plants, windchimes, artwork). The decorative items provide an attractive appearance and allow the home to be customized as desired by the owner. However, conventional hanging devices have undesirable drawbacks. For example, many prior art hanging devices are aesthetically unpleasing and require expensive and time-consuming installation; often by professionals. Further, some conventional hanging devices are unreliable and cannot support the weight of potted plants, artwork, gardening tools, and other items. Other options cause damage to the support structure upon which the hanger is installed and must be drilled into a support beam. Often, conventional hanging devices are permanently mounted and cannot be easily moved to a new location without leaving a hole or other damage at the original hanging location. It would therefore be beneficial to provide a hanging device that overcomes the shortcomings of the prior art.

SUMMARY

In some embodiments, the presently disclosed subject matter is directed to a hanger. Particularly, the hanger comprises a main body defined by a first end and an opposed second end with a length therebetween, a front face and an opposed rear face. The hanger further includes a flange comprising a first end and a second end, the first end of the flange operatively connected to the rear face of the main body at the first end, wherein the flange is perpendicular relative to the main body. The hanger includes a retention element comprising a first end and a second end, wherein the first end of the retention element is operatively connected to the front face of the main body at the second end, and wherein the retention element is positioned at an acute angle relative to the main body.

In some embodiments, the flange is square or rectangular is shape.

In some embodiments, the retention element angle is adjustable relative to the main body.

In some embodiments, the flange has a square or rectangular cross-sectional shape.

In some embodiments, the flange has a length of about 1-25 percent of the total length of the main body.

In some embodiments, the flange has a length of about 1-5 percent of the total length of the main body.

In some embodiments, the retention element comprises a projection that extends away from the front face of the main body.

In some embodiments, the retention element is releasably attached to the second end of the main body.

In some embodiments, the hanger further includes a support arm defined by a first end and a second end, the first end operably attached to a distal end of the retention element and a second end operably attached to the main body.

In some embodiments, the support art creates a recess within the interior of the hanger in a triangular, rectangular, square, semi-circular, or pentagonal shape.

In some embodiments, the presently disclosed subject matter is directed to a kit comprising a plurality of hangers. Each hanger includes a main body defined by a first end and an opposed second end with a length therebetween, a front face and an opposed rear face. Each hanger also includes a flange comprising a first end and a second end, the first end of the flange operatively connected to the rear face of the main body at the first end, wherein the flange is perpendicular relative to the main body. Further, each hanger is defined by a retention element comprising a first end and a second end, wherein the first end of the retention element is operatively connected to the front face of the main body at the second end, and wherein the retention element is positioned at an acute angle relative to the main body. In some embodiments, at least one hanger differs from at least one other hanger with respect to size, shape, angle of retention element, material used to construct the hanger, or combinations thereof In some embodiments, the kit includes a set of instructions for use.

In some embodiments, at least one hanger comprises a support arm defined by a first end and a second end, the first end operably attached to a distal end of the retention element and a second end operably attached to the main body.

In some embodiments, the presently disclosed subject matter is directed to a method of installing a hanger between an upper horizontal board and a lower horizontal board of a support surface. Particularly, the method comprises inserting the flange of a hanger adjacent to an upper horizontal surface of the lower board. The hanger is defined by a main body defined by a first end and an opposed second end with a length therebetween, a front face and an opposed rear face; a flange comprising a first end and a second end, the first end of the flange operatively connected to the rear face of the main body at the first end, wherein the flange is perpendicular relative to the main body; and a retention element comprising a first end and a second end, wherein the first end of the retention element is operatively connected to the front face of the main body at the second end, and wherein the retention element is positioned at an acute angle relative to the main body. The force exerted by the upper board on the lower board maintains the hanger in position between the upper horizontal board and the lower horizontal board.

In some embodiments, the upper and lower horizontal boards are selected from siding, cement planks, hardie plank, or combinations thereof.

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is generally directed to a hanging device that can be removably installed between the boards of a support surface, such as siding boards. The term "siding boards" refer broadly to building materials used to cover an exterior or interior surface in both commercial and residential applications. The siding boards can be constructed from any suitable material, such as composites made of cement reinforced with cellulose fibers, vinyl, polyvinyl chloride, wood, wood composite, metal (e.g., aluminum), and the like. The siding boards are typically hung in a horizontal orientation, although they can be angled or vertical in some applications.

Figure 1A:
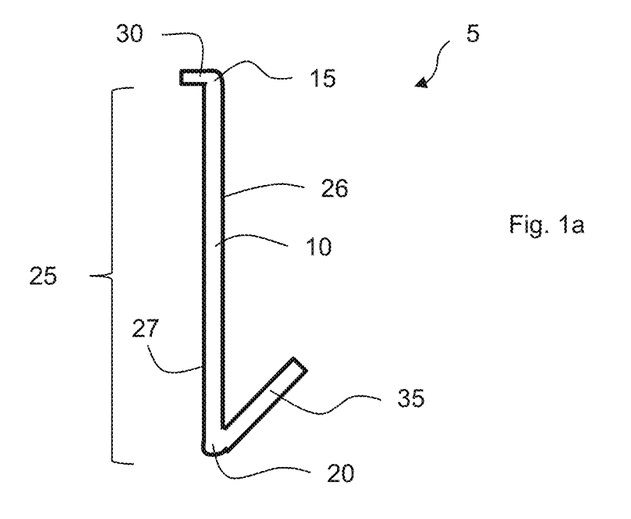
FIG. 1a is a side plan view of a hanging device in accordance with some embodiments of the presently disclosed subject matter.
Figure 1B:
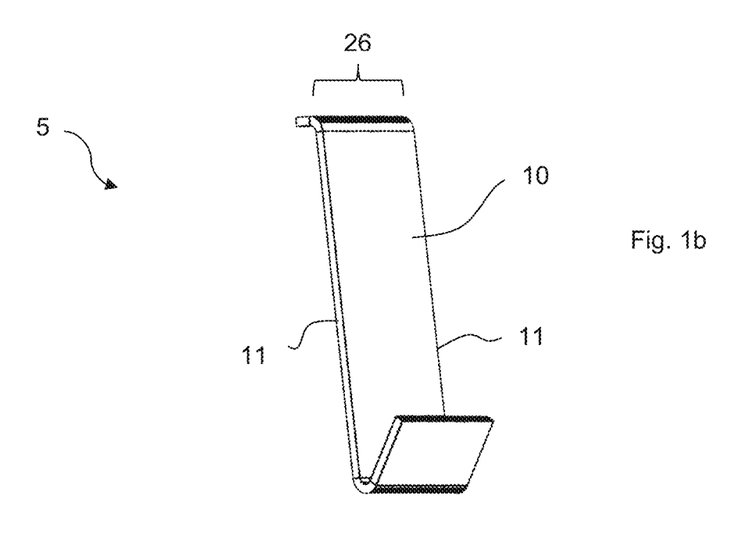
FIG. 1b is a perspective view of a hanger in accordance with some embodiments of the presently disclosed subject matter.

FIGS. 1a and 1b illustrate one embodiment of hanger 5 that can be used to support the weight of an object between the boards of a support surface as described herein. The term "hanger" refers generally to any support on or by which something can be hung. As shown, hanger 5 comprises main body 10 with first and second ends 15, 20 and length 25 therebetween. The main body further includes front face 26 and opposed rear face 27. Flange 30 is positioned at first end 15 of the main body, and functions to retain the hanger in between adjacent slats of a support surface, as described in more detail below. Second end 20 of the main body includes retention element 35 that can be used to support the weight of an object, such as a hanging plant, artwork, shelving unit, and the like.

Main body 10 includes length 25 of about 1-20 inches (e.g., at least/no more than about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or 20 inches). However, the presently disclosed subject matter is not limited and the length of hanger main body 10 can be greater or less than the range given above. The term "length" refers to the longest straight line distance between the first and second ends of the main body.

The main body further includes width 26 of about 0.1-2 inches (e.g., at least/no more than about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 inches). The term "width" can refer to the longest straight line distance perpendicular to the length (e.g., between main body edges 11).

Figure 1C:
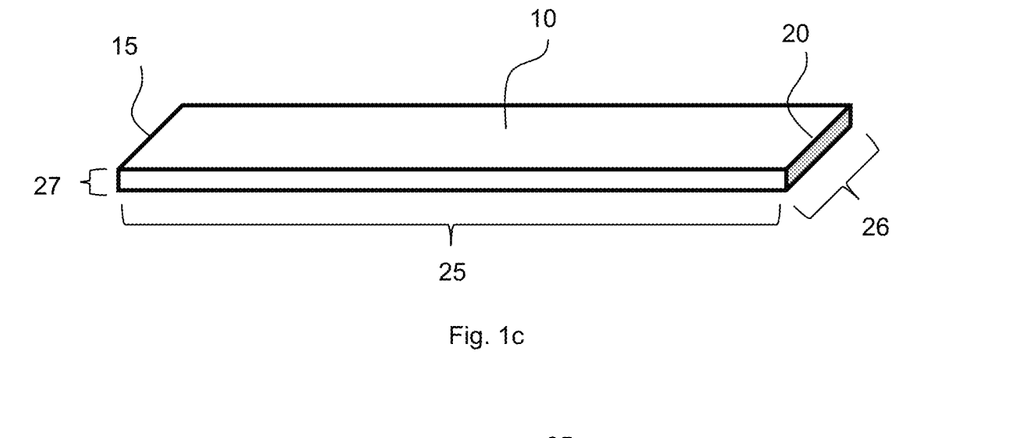
FIG. 1c is a perspective view of a hanger main body in accordance with some embodiments of the presently disclosed subject matter.

Main body 10 includes thickness 27 of about 0.01-0.25 inches, as shown in FIG. 1c. Thus, the main body thickness can be at least about (or no more than about) 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25 inches. The term "thickness" refers to the longest vertical distance between the top and bottom faces of the main body. It should be appreciated that the presently disclosed subject matter is not limited and the main body thickness can be configured outside the given range.

The main body can have any desired cross-sectional shape, such as (but not limited to) circular, oval, square, rectangular, triangular, octagonal, hexagonal, pentagonal, and the like. In some embodiments, the term "cross-sectional" refers to a shape that extends laterally through the hanger and that is orthogonal to the longitudinal axis of the hanger.

Figure 2A:
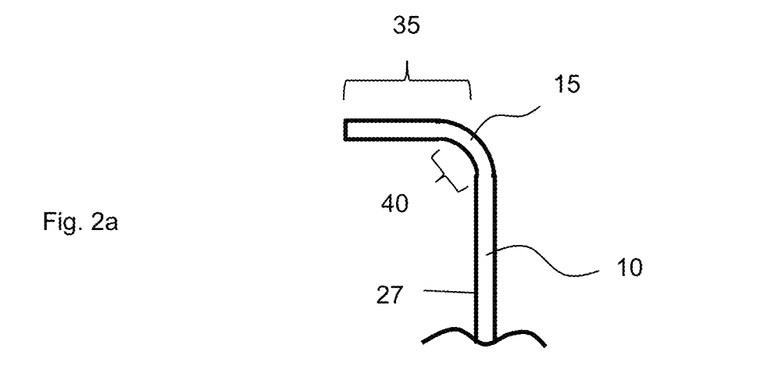
FIGS. 2a-2c are side plan views of a hanger flange in accordance with some embodiments of the presently disclosed subject matter.

As described above, flange 30 is positioned at the first end of the main body on rear face 27, as illustrated in FIG. 2a. The flange can have any suitable length 35, such as about 0.1-1 inch (e.g., at least/no more than about 0.1, 0.2, 0.3, 0.4, 0.5, 0.6, 0.7, 0.8, 0.9, or 1 inch). However, the presently disclosed subject matter is not limited and the length of flange 30 can be greater or less than the range given above.

In some embodiments, flange 30 has a length that is about 1-25 percent the length of the main body (e.g., at least/no more than about 1, 5, 10, 15, 20, or 25 percent). Thus, if the main body comprises a length of 10 inches, the flange can be configured with a length of about 0.1 inches to 2.5 inches (about 1-25 percent the length of the main body). However, the flange can be configured with any desired length relative to the main body.

Figure 2B:
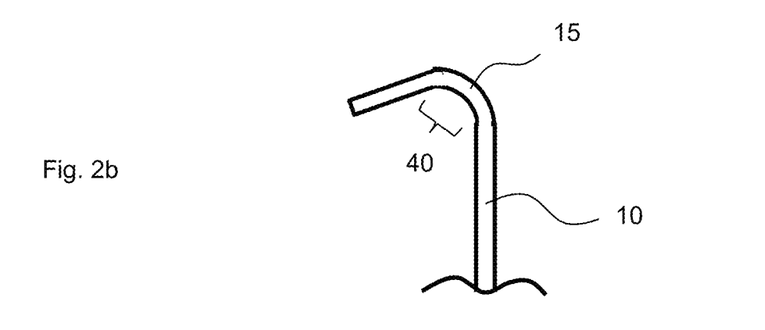
Figure 2C:
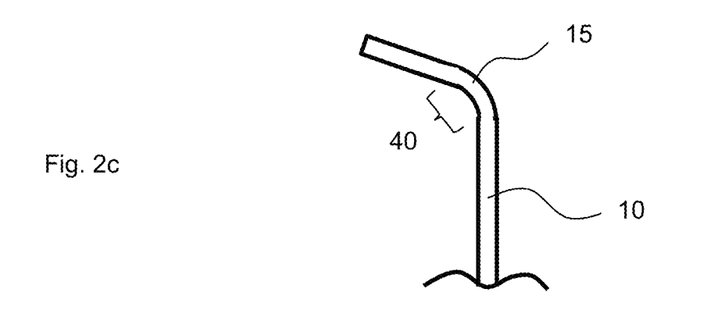

Flange 30 extends from first end 15 of the main body at angle 40. In some embodiments, angle 40 can be about 90 degrees (e.g., about perpendicular to the main body). Advantageously, an angle of about 90 degrees can allow the flange to rest on the lower siding board during use. However, angle 40 is not limited and can be acute (less than 90 degrees) or obtuse (greater than 90 degrees) as shown in FIGS. 2b and 2c. Thus, angle 40 can be at least about (or no more than about) 45, 50, 55, 60, 65, 70, 75, 80, 85, 90, 95, 100, 105, 110, 115, 120, 125, 130, or 135 degrees. It should be appreciated that angle 40 can also be outside the ranges given herein.

Figure 2D:
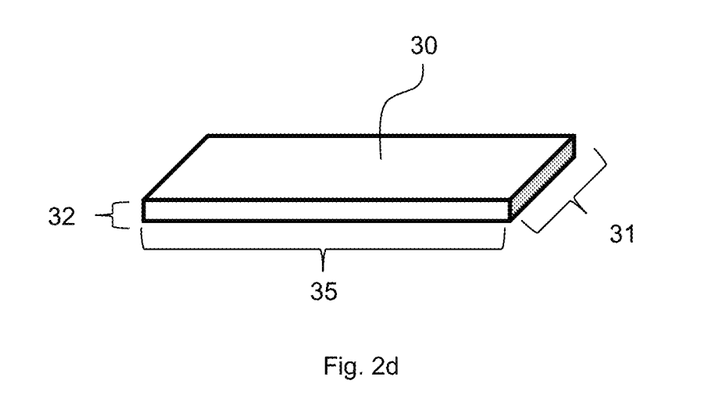
FIG. 2d is a perspective view of a hanger flange in accordance with some embodiments of the presently disclosed subject matter.

In some embodiments, the flange can have width 31 and/or thickness 32 configured with about the same dimensions as the hanger main body, as shown in FIG. 2d. Thus, the flange width can be about 0.1-2 inches (e.g., at least/no more than about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 inches). In some embodiments, the flange thickness can be at least about (or no more than about) 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25 inches. However, the flange dimensions can vary and are not limited to the given ranges.

The flange can have any desired cross-sectional shape, such as (but not limited to) circular, oval, square, rectangular, triangular, octagonal, hexagonal, pentagonal, and the like.

As described above, second end 20 of the main body is operatively connected to retention element 35 that can be used to hang one or more items. The term "retention element" broadly refers to any device configured to retain an item. Suitable retention elements can include (but are not limited to) one or more hooks, clips, ledges, magnets, ties, hook and loop closures, or fasteners. Thus, any element that can be used to releasably connect with an object can be used. In some embodiments, an object can be hung or retained on element 35. In other embodiments, an object can be releasably attached to element 35 using mechanical closures (e.g., magnets, screws, bolts, and the like). The retention element therefore can be configured as a projection that extends away from the front face of the main body, adapted to support an object, such as a picture frame or hanging plant.

Figure 3A:
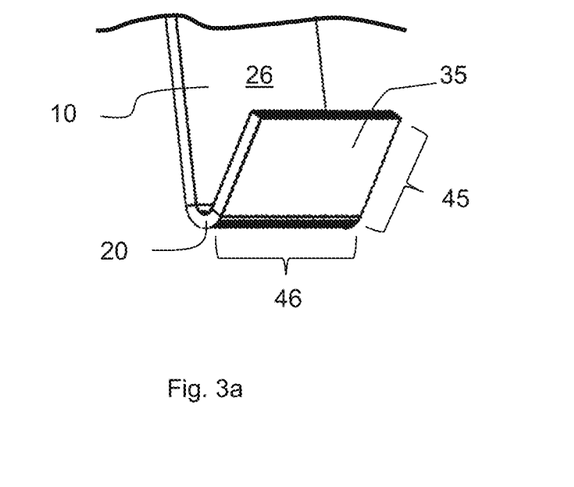
FIG. 3a is a perspective view of a hanger retention element in accordance with some embodiments of the presently disclosed subject matter.
Figure 3B:
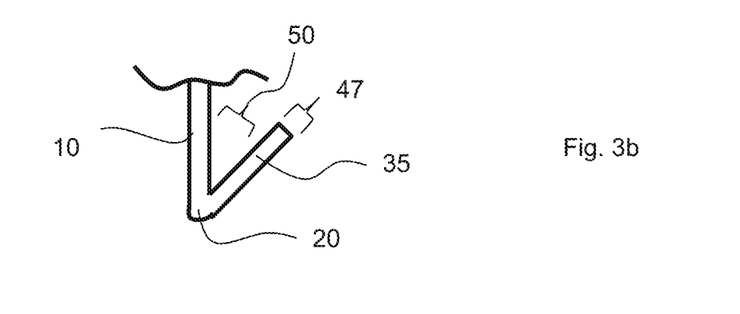
FIGS. 3b-3d are side plan view of hanger retention elements in accordance with some embodiments of the presently disclosed subject matter.
Figure 3C:
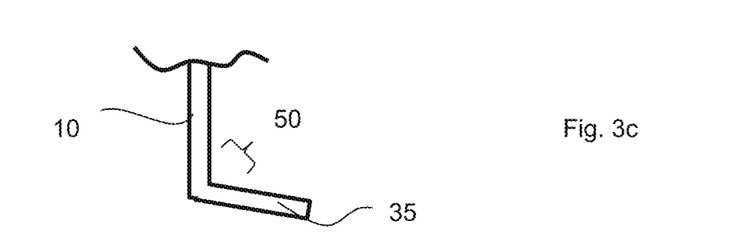

As shown in FIGS. 3a and 3b, retention element 35 is operably attached to second end 20 at front face 26 of the main body. The retention element can have any suitable length 45, such as about 0.1-2 inches (e.g., at least/no more than about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 inches). However, the presently disclosed subject matter is not limited and the length of retention element 35 can be greater or less than the range given above.

In some embodiments, the retention element can have width 46 and/or thickness 47 configured with about the same dimensions as the hanger main body. Thus, the retention element width can be about 0.1-2 inches (e.g., at least/no more than about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 inches). In some embodiments, the retention element thickness can be at least about (or no more than about) 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25 inches. However, the retention element dimensions can vary and are not limited to the given ranges.

Figure 3D:
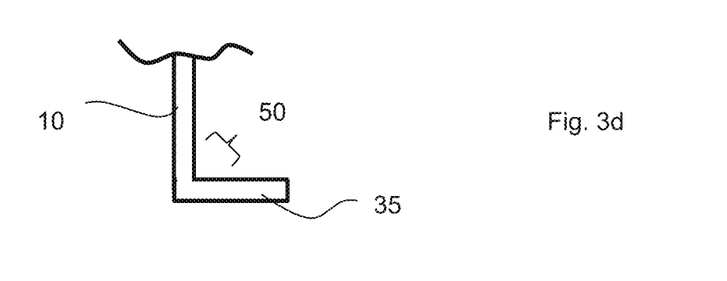

Retention element 35 extends from second end 20 of the main body at angle 50. In some embodiments, angle 50 can be acute (e.g., less than about 90 degrees). Thus, angle 50 can range from about 5-89 degrees (at least/no more than about 5, 15, 20, 25, 30, 35, 40, 45, 50, 55, 60, 65, 70, 75, 80, 85, or 89 degrees). However, angle 50 is not limited and can be obtuse (greater than 90 degrees, such as about 91, 95, 100, 105, 110, 115, 120, 125, 130, 135, 140, 145, or 150 degrees) or perpendicular as shown in FIGS. 3d and 3d.

In some embodiments, retention element angle 50 can be adjustable as desired by the user. For example, conventional mechanism can be used, such as series of slots or clips.

The retention element can have any desired cross-sectional shape, such as (but not limited to) circular, oval, square, rectangular, triangular, octagonal, hexagonal, pentagonal, and the like.

In some embodiments, flange 30 and retention element 35 are permanently attached to ends 15, 20 of the main body using conventional techniques, such as adhesive, welding, thermoforming, and the like. However, in some embodiments, the flange and/or retention element can be releasably attached to the main body, such as through one or more magnets, clips, fasteners, ties, screws, bolts, etc. In this way, different flange and retention elements can be interchanged as desired by the user.

Figure 4A:
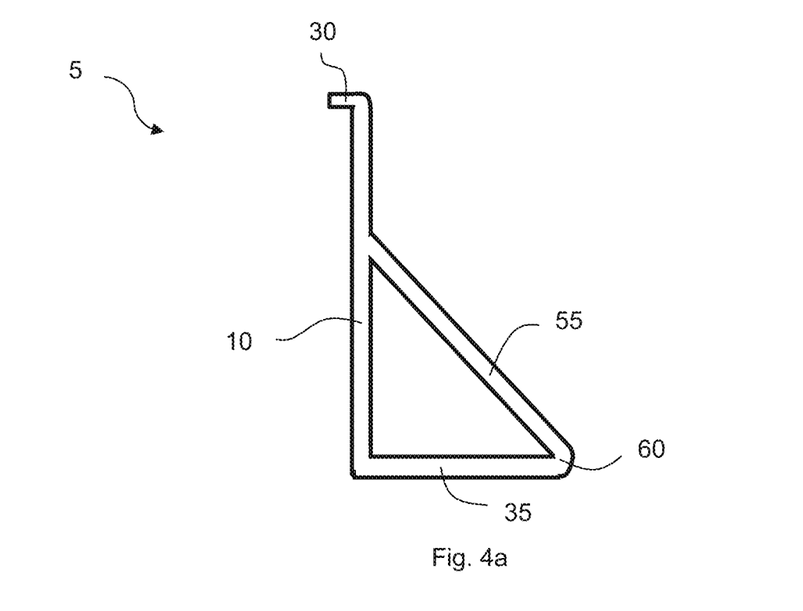
FIG. 4a is a side plan view of a hanger with an optional support arm in accordance with some embodiments of the presently disclosed subject matter.
Figure 4B:
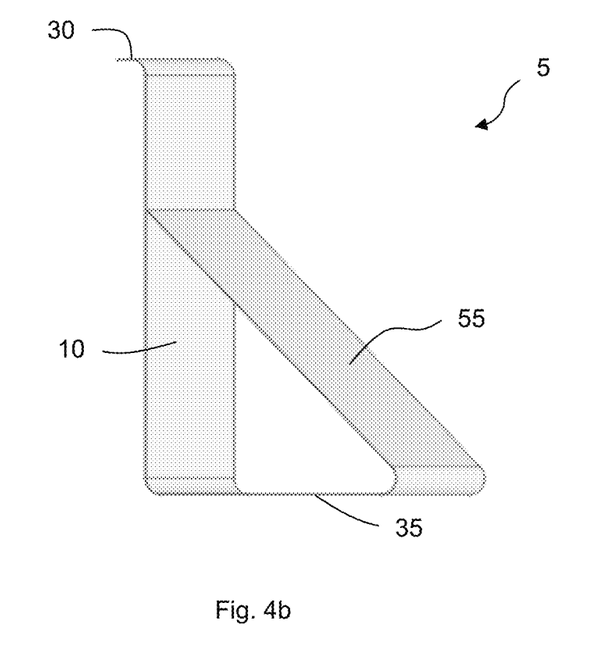
FIG. 4b is a perspective view of a hanger with a support arm in accordance with some embodiments of the presently disclosed subject matter.
Figure 4C:
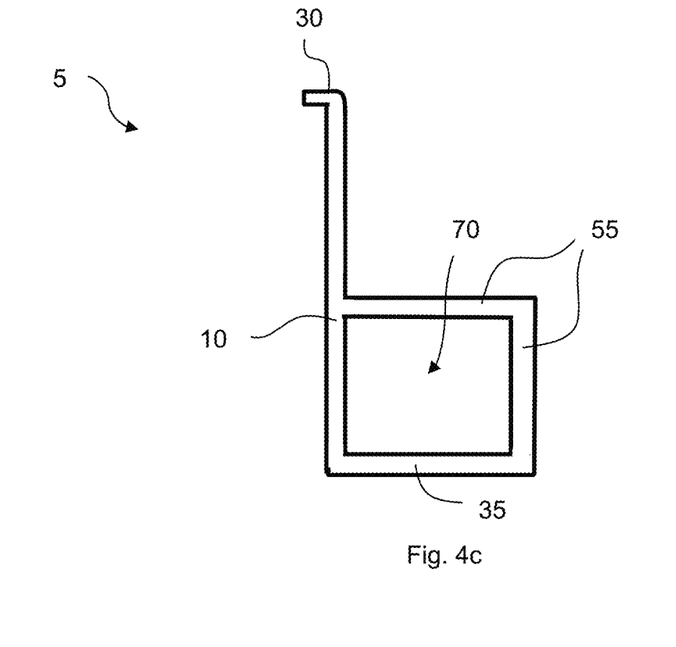
FIGS. 4c-4f are side plan views of hangers with support arms in accordance with some embodiments of the presently disclosed subject matter.
Figure 4D:
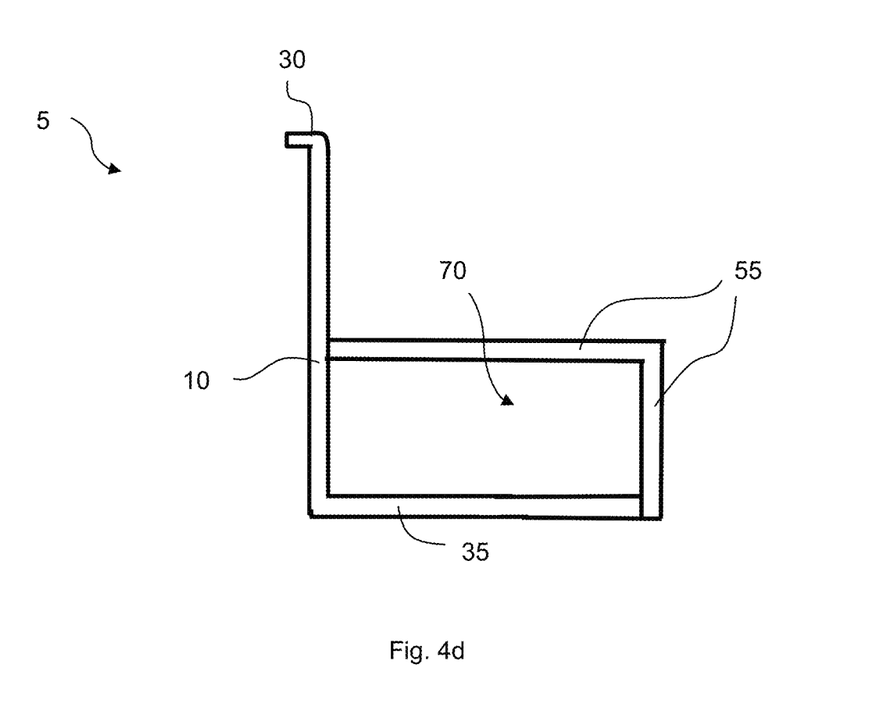
Figure 4E:
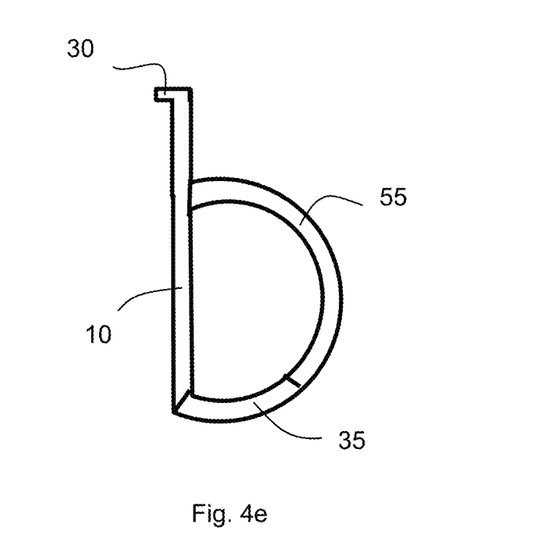
Figure 4F:
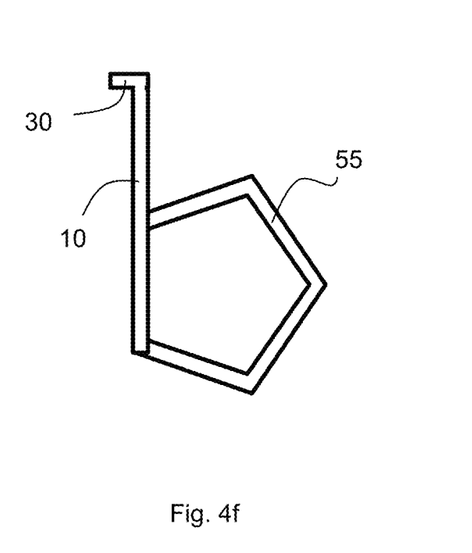

In some embodiments, the retention element can include support arm 55 that extends from distal end 60 of the element and attaches to the front face of the main body, as shown in the embodiment of FIGS. 4a and 4b. Thus, attachment of the support arm creates a closed loop that provides for the attachment of a hook or other object. In some embodiments, the support arm is attached about halfway between the main body first and second arms 15, 20. In other embodiments, the support arm is attached about 10, 20, 30, or 40 percent of the total length from the first or second end of the main body (e.g., if the main body is 10 inches, the support arm can attach at a location of about 1, 2, 3, or 4 inches from the first or second end).

The support arm can include length 60 of about 1-20 inches (e.g., at least/no more than about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or 20 inches). The support arm can further include width 61 of about 0.1-2 inches (e.g., at least/no more than about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 inches). The support art can have thickness 62 of about 0.01-0.25 inches (at least/no more than about 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25 inches).

The support arm can create recess 70 of any desired shape, such as the triangular configuration of FIG. 4a. However, any shape can be formed, such as square, rectangular, semi-circular, pentagonal, and the like, as illustrated in FIGS. 4c-4f. Any shape can be formed.

Further, support arm 55 can be permanently attached to the retention element and main body using conventional elements such as welding, adhesive, thermoforming, and the like. Alternatively, the support arm can be releasably attached via one or more clips, snap-fit closure, pressure fit closure, ties, magnets, fasteners, and the like to allow a user to customize the support arm shape, size, etc. for a particular object to be hung.

Hanger 5 can be constructed from any of a wide variety of rigid materials. The term "rigid material" refers to a material that does not deform under the action of an external force or whose defamation may be negligible under the action of an external force. Suitable rigid materials can include (but are not limited to) wood, metal (e.g., aluminum, stainless steel, copper), plastic (PVC, ABS, polycarbonate, etc.), stone, or combinations thereof.

The hanger can be constructed in any desired color or pattern, such as to create a rustic or wooden appearance, as well as other variations. In this way, hanger 5 is suitable for use with a variety of siding materials.

Any conventional method can be used to construct hanger 5, such as (but not limited to) welding, thermoforming, and the like. Thus, each part of hanger 5 can be formed integrally in a molding process to create a one-piece construction that is easily manufactured.

In some embodiments, the hanger can be provided as part of a kit. For example, the kit can include a variety of hangers of different sizes. In some embodiments, the hangers can include a variety of retention elements (e.g., one hook, two hooks, a ledge, a loop, a magnet, etc.). In some embodiments, the kit can further comprise one or more hangers that include support arms 55 in various orientations. The kit can further include instructions for use.

Figure 5A:
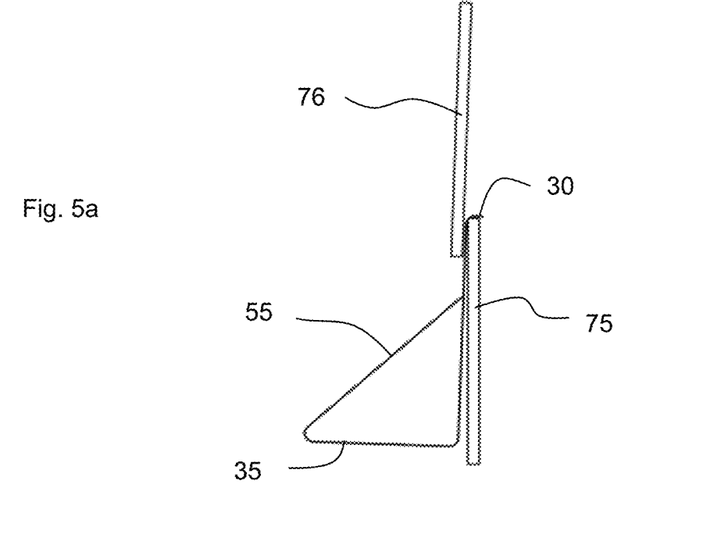
FIG. 5a is a side plan view of a hanger in use in accordance with some embodiments of the presently disclosed subject matter.
Figure 5B:
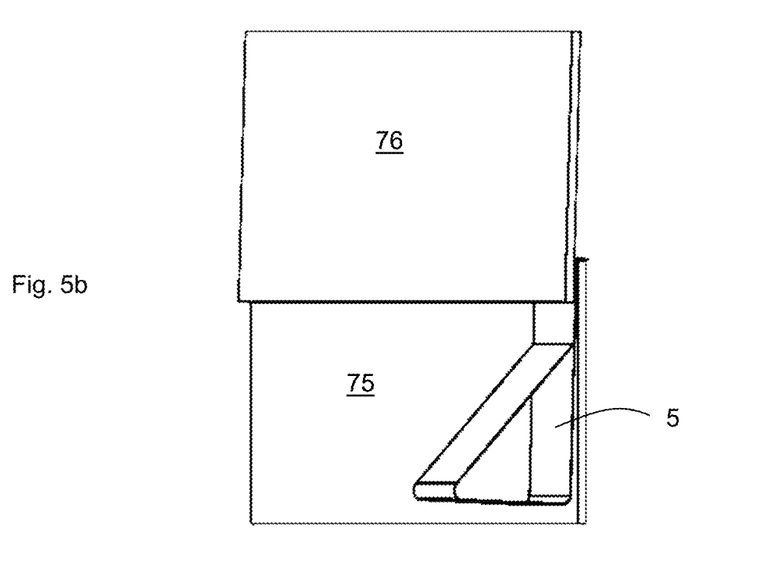
FIG. 5b is a perspective view of a hanger in use in accordance with some embodiments of the presently disclosed subject matter.
Figure 5C:
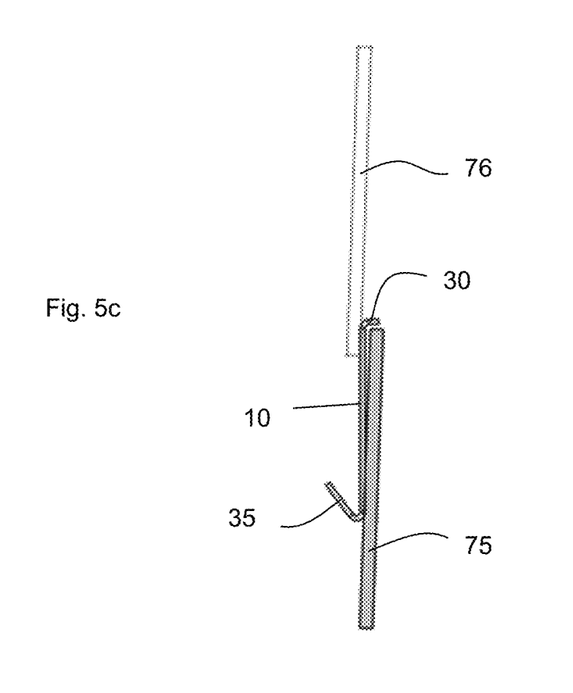
FIG. 5c is a side plan view of a hanger in use in accordance with some embodiments of the presently disclosed subject matter.
Figure 5D:
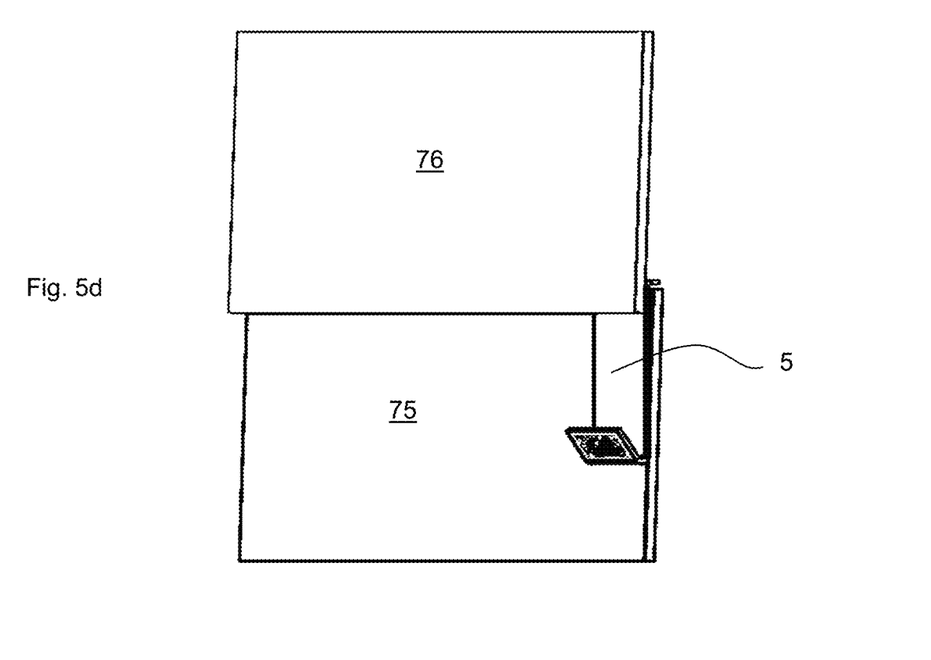
FIG. 5d is a perspective view of a hanger in use in accordance with some embodiments of the presently disclosed subject matter.
Figure 5E:
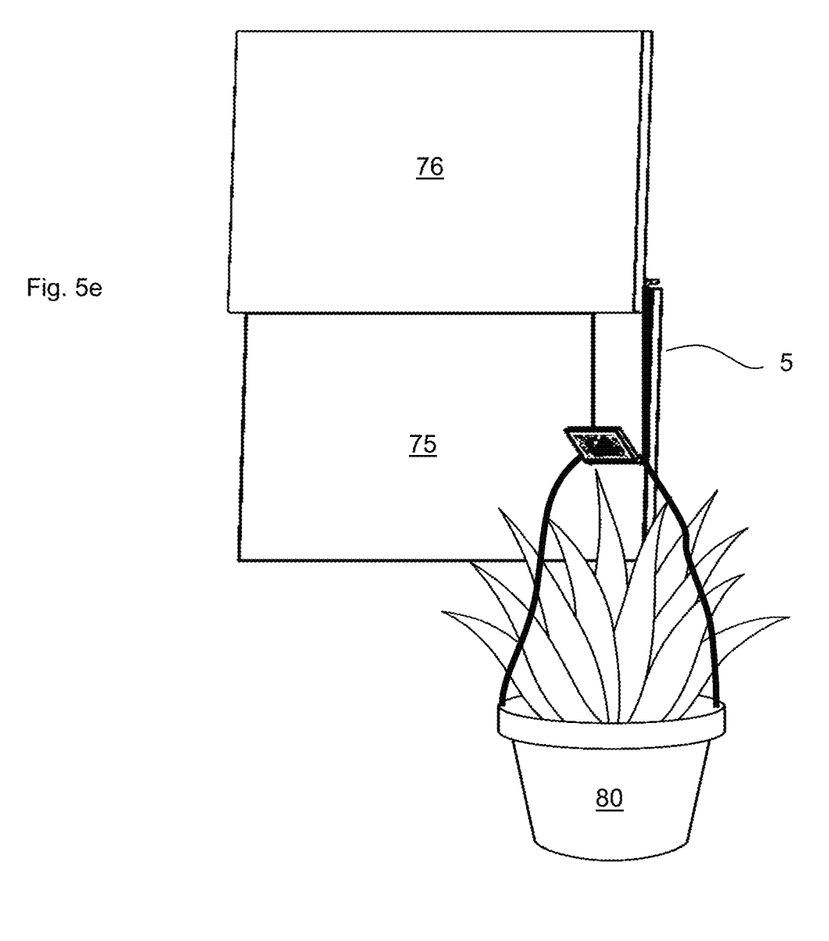
FIG. 5e is a perspective view of an installed hanging used to hang an object in accordance with some embodiments of the presently disclosed subject matter.

In use, hanger 5 can be removably positioned between adjacent boards of siding to hang one or more objects (e.g., plants, windchimes, etc.). Particularly, hanger flange 30 is sized and shaped to be inserted between adjacent siding boards, as shown in FIGS. 5a-5d. To insert the hanger, the flange is forced in between the siding boards such that flange 30 rests on the horizontal top edge of lower siding board 75 and is held firmly in place by top siding board 76. In some embodiments, a tool (e.g., a flat head screwdriver) can be inserted in between boards 75, 76 to provide room for insertion of flange 30. The tool can be twisted or maneuvered as needed to allow the flange to be inserted. After the flange is positioned on the top edge of the lower siding board, the tool can be removed. The hanger is thus held in position by the tension force applied by the top board against the flange and the main body. One or more objects 80 can then be positioned or hung on retention element 30 for a desired amount of time, as shown in FIG. 5e. In this way, outside patios and indoor spaces comprising siding, hardie plank, cement boards, and the like can be used to hang one or more objects. The hanger can be used alone or in series, such as to create shelving.

To remove device 5 from boards 75, 76, a user simply adjusts flange 30 from in between the boards and detaches the device. In some embodiments, a tool can be used as described above for inserting the device. The device can then be repositioned to a new location for hanging one or more objects.

The disclosed hanging device therefore provides many advantages over prior art hanging systems. Specifically, hanger 5 can support a wide variety of objects, from artwork to potted plants to shelving.

Hanger 5 is lightweight (e.g., weighing from about 0.1-1 pound depending on the materials used and the size). As such, the device does not damage the siding boards during or after use.

Advantageously, the hanger can be easily moved from one location to another without leaving permanent holes or marks in the support surface.

The hanger is simple and easy to use, allowing both children and adults to install and remove the device as desired.

Hanger 5 can be used with a variety of products, such as hanging plants, flowerpots, artwork, shelving, and the like.

The hanger can include a variety of detachable accessories that support various different types of objects, such as flowerpots and windchimes.

The foregoing descriptions have been presented for purposes of illustration and description and are not intended to be exhaustive or to limit the presently disclosed subject matter. Many modifications and variations are possible in light of the present disclosure.

What is claimed is:

1. A method of repositioning a removable hanger between an upper horizontal board and a lower horizontal board forming support surface for the removable hangar, the method comprising:
    removing a flange of the removable hanger when the removable hanger is adjacent to an upper horizontal surface of the lower horizontal board, wherein the removable hanger is defined by:
        a main body defined by a first end and an opposed second end with a length therebetween, a front face and an opposed rear face;
        a flange comprising a first end and a second end, the first end of the flange operatively connected to the rear face of the main body at the first end, wherein the flange is perpendicular relative to the main body; and
        a retention element comprising a first end and a second end, wherein the first end of the retention element is operatively connected to the front face of the main body at the second end, and wherein the retention element is positioned at an acute angle relative to the main body; and reinserting the flange of the removable hanger, wherein force exerted by the upper horizontal board maintain the removable hanger in position between the upper horizontal board and the lower horizontal board, wherein each of the upper and lower horizontal boards is selected from a siding, a cement plank, a fiber cement board, or a combination thereof;

wherein the flange has a length of about one to ten percent of the total length of the main body, the length being such that the removable hanger is insertable, removable, and reinsertable without requiring any damage to be caused to the support surface, and wherein the flange is configured as a solid member, lacking an aperture wherein the upper horizontal board comprises an upper fiber cement board positioned above the flange, wherein the lower horizontal board comprises a lower fiber cement board positioned below the flange, and wherein the flange is maintained between the upper and lower fiber cement boards such that the retention element is accessible.

2. The method of claim 1, wherein the damage comprises a hole or a mark, wherein a tool is temporarily insertable between the upper and lower horizontal boards to temporarily increase a size of a gap between the upper and lower horizontal boards to facilitate removing and reinserting the flange of the removable hanger while the size of the gap is temporarily increased, the tool comprising a flat-head screwdriver.

3. The method of claim 2, wherein the flange is square or rectangular in shape and has a square or rectangular cross-sectional shape and, wherein the flange has a length of about 1-5 percent of the total length of the main body.

4. The method of claim 3, wherein the upper horizontal board comprises an upper fiber cement board positioned above the flange, wherein the lower horizontal board comprises a lower fiber cement board positioned below the flange, and wherein the flange is maintained between the upper and lower fiber cement boards such that the retention element is accessible.

5. The method of claim 1, wherein a tool is temporarily insertable between the upper and lower horizontal boards to temporarily increase a size of a gap between the upper and lower horizontal boards to facilitate removing and reinserting the flange of the removable hanger while the size of the gap is temporarily increased.

6. The method of claim 5, wherein the tool comprises a screwdriver.

7. The method of claim 1, wherein the damage comprises a hole or a mark.

8. The method of claim 1, wherein the flange is square or rectangular in shape.

9. The method of claim 1, wherein the flange has a square or rectangular cross-sectional shape.

10. The method of claim 1, wherein the flange has a length of about 1-5 percent of the total length of the main body.

11. The method of claim 1, wherein force exerted by the upper horizontal board on the removable hanger is necessary to maintain the removable hanger in position between the upper horizontal board and the lower horizontal board.

12. The method of claim 1, wherein the removable hanger comprises a component of a hanger kit that includes a set of instructions for using the removable hanger.

13. A system comprising:
a removable hanger;
an upper horizontal board; and
a lower horizontal board;
wherein the upper and lower horizontal boards form a support surface for the removable hanger, wherein the removable hanger is repositionable between the upper horizontal board and the lower horizontal board, and wherein the removable hanger comprises:
a main body defined by a first end and an opposed second end with a length therebetween, a front face and an opposed rear face;
the flange, which comprises a first end and a second end, the first end of the flange operatively connected to the rear face of the main body at the first end, wherein the flange is perpendicular relative to the main body;
a retention element comprising a first end and a second end, wherein the first end of the retention element is operatively connected to the front face of the main body at the second end, and wherein the retention element is positioned at an acute angle relative to the main body;
wherein the flange has a length of about 1-10 percent of the total length of the main body, the length being such that the removable hanger is insertable, removable, and reinsertable without requiring any damage to be caused to the support surface, wherein force exerted by the upper horizontal board on the removable hanger is necessary to maintain the removable hanger in position between the upper horizontal board and the lower horizontal board, wherein each of the upper and lower horizontal boards is selected from a siding, a cement plank, a fiber cement board, or a combination thereof, and wherein the flange is configured as a solid member, lacking an aperture wherein the upper horizontal board comprises an upper fiber cement board positioned above a flange of the removable hanger, and wherein the flange is maintained between the upper and lower fiber cement boards such that the retention element is accessible.

14. The system of claim 13, wherein the flange is square or rectangular in shape.

15. The system of claim 13, wherein the flange has a square or rectangular cross-sectional shape.

16. The system of claim 13, wherein the flange has a length of about 1-5 percent of the total length of the main body.

17. A system comprising: A hanger kit that includes a plurality of removable hangers;
an upper horizontal board; and a lower horizontal board;
wherein the upper and lower horizontal boards form a support surface for one or more removable hangers of the plurality of removable hangers, wherein each removable hanger of the plurality of removable hangers is repositionable between the upper horizontal board and the lower horizontal board, and wherein each removable hanger of the plurality of removable hangers is defined by:
a main body defined by a first end and an opposed second end with a length therebetween, a front face and an opposed rear face;
a flange comprising a first end and a second end, the first end of the flange operatively connected to the rear face of the main body at the first end, wherein the flange is perpendicular relative to the main body; and
a retention element comprising a first end and a second end, wherein the first end of the retention element is operatively connected to the front face of the main body at the second end, and wherein the retention element is positioned at an acute angle relative to the main body; and wherein each flange has a length of about 1-10 percent of the total length of the main body, the length being such that the respective removable hanger defined by the respective flange is insertable, removable, and reinsertable without requiring any damage to be caused to the support surface, wherein force exerted by the upper horizontal board on at least one hanger is necessary to maintain the at least one hanger in position between the upper horizontal board and the lower horizontal board, wherein each of the upper and lower horizontal boards is selected from a siding, a cement plank, a fiber cement board, or a combination thereof, and wherein each flange is configured as a solid member, lacking an aperture wherein the upper horizontal board comprises an upper fiber cement board positioned above the flange, wherein the lower horizontal board comprises a lower fiber cement board positioned below the flange, and wherein the flange is maintained between the upper and lower fiber cement boards such that the retention element is accessible.

18. The system of claim 17, wherein at least one flange is square or rectangular in shape.

19. The system of claim 17, wherein at least one flange has a length of about 1-5 percent of the total length of the main body of the removable hanger defined by the at least one flange.

20. The system of claim 17, wherein at least one removable hanger differs from at least one other removable hanger with respect to size, shape, angle of retention element, material used to construct the hanger, or combinations thereof.

* * * * *